United States Patent [19]

Azuma

[11] Patent Number: 4,772,975

[45] Date of Patent: Sep. 20, 1988

[54] MAGNETIC REPRODUCING APPARATUS

[75] Inventor: Nobuo Azuma, Yokohama, Japan

[73] Assignee: Hitachi, Ltd., Tokyo, Japan

[21] Appl. No.: 886,417

[22] Filed: Jul. 17, 1986

[30] Foreign Application Priority Data

Jul. 22, 1985 [JP] Japan .................................. 60-160107

[51] Int. Cl.$^4$ ........................................ H04N 05/783
[52] U.S. Cl. .................... 360/10.1; 360/33.1;
  360/10.3; 360/38.1; 358/312; 358/336; 358/335
[58] Field of Search .................... 360/10.1, 10.2, 10.3,
  360/73, 74.1, 32, 38.1, 14.1, 14.2, 14.3, 33.1;
  358/312, 336, 335

[56] References Cited

U.S. PATENT DOCUMENTS

| | | | |
|---|---|---|---|
| 4,199,780 | 4/1980 | Taylor | 360/38.1 |
| 4,290,081 | 9/1981 | Loerster | 360/10.3 |
| 4,389,678 | 6/1983 | Mizukami | 360/10.3 |
| 4,395,738 | 7/1983 | Hedlund | 360/32 |

FOREIGN PATENT DOCUMENTS 45785  3/1984  Japan .................................. 360/10.1

Primary Examiner—Alan Faber
Attorney, Agent, or Firm—Antonelli, Terry & Wands

[57] ABSTRACT

During still reproduction, slow-motion reproduction and the like reproduction mode in a magnetic reproducing apparatus, a magnetic tape is travelled intermittently at a standard travel speed, i.e., at the same tape speed as that for recording, and a video signal reproduced over a period during which the magnetic tape runs at the standard travel speed is written into an image memory. During the standard travel speed period of the magnetic tape, a magnetic head correctly traces recording tracks on the magnetic tape and so the video signal of less noise is stored in the image memory. The video signal stored in the image memory is read out to provide for reproduced still and slow-motion output signal.

10 Claims, 7 Drawing Sheets

MAGNETIC REPRODUCING APPARATUS

BACKGROUND OF THE INVENTION

This invention relates to magnetic reproducing apparatus for reproduction of video signals from a magnetic tape which is recorded with the video signals by means of a helical scan type video tape recorder and, more particularly, to a magnetic tape recorder capable of performing special image reproduction such as high-speed search, slow-motion and still reproduction.

When, in a conventional helical scan type magnetic recording and reproducing apparatus, recorded video signals are reproduced in variable speed reproduction modes such as high-speed search, continuous slow-motion, intermittent slow-motion, still reproduction and frame feed reproduction, the travel speed of the magnetic tape is changed while the rotary head drum continues to rotate. As an example, a magnetic recording and reproducing apparatus disclosed in Japanese patent unexamined publication No. 59-45785 may be noted which is adapted to perform, for example, intermittent slow-motion reproduction.

Because, in the variable speed reproduction mode, relative speed between the magnetic head and the magretic tape used during reproduction is however different from relative speed used during recording, the rotary head scans, for reproduction, the magnetic tape at a helix angle different from that of a recording track pattern formed on the magnetic tape during recording. This leads to a tracking error which causes the envelope of a reproduced video signal to form into a rhomb and hence a noise band occurs on a reproduced picture display screen at a decreased level portion of the reproduced video signal, thus degrading quality of picture.

Therefore, in a prior art magnetic recording apparatus, the travel speed of the magnetic tape and the timing for intermittent travel have been controlled such that an interval of time during which the noise band occurs is confined within the vertical blanking period or duration.

The prior art magnetic reproducing apparatus fails however to provide complete prevention of the occurrence of the noise band. Especially in the high-speed search mode, the noise band occurs on the reproduced picture display screen at a plurality of locations, resulting in impairment of clear visualization of the picture.

SUMMARY OF THE INVENTION

An object of this invention is to provide a magnetic reproducing apparatus capable of preventing the noise band from occurring in the special reproduction mode of the magnetic reproducing apparatus.

The magnetic reproducing apparatus in accordance with this invention is featured by the provision of an image memory for storing at least one field portion of a video signal, a magnetic tape travel control circuit for causing a magnetic tape to travel or run intermittently at predetermined intervals of time at a standard travel speed (equal to a tape travel speed when recording), and a memory control circuit for extracting at least the one field portion of the video signal from the magnetic tape each time the magnetic tape reaches the standard travel speed so as to write an extracted portion into the image memory and for repetitively reading the written video signal portion during variable speed reproduction mode period excepting at least the write period so as to deliver the read video signal portion out of the apparatus.

Since the magnetic tape travel control circuit enables intermittent travelling of the magnetic tape at the standard travel speed, the rotary magnetic head is allowed to correctly effect intermittent tracing on video signal tracks formed on the magnetic tape. The memory control circuit operates to fetch a video signal picked-up by the rotary magnetic head into an image memory at a timing of the rotary magnetic head correctly tracing on the video signal tracks, that is, the timing of the magnetic tape running at standard travel speed and thereafter control the image memory such that it delivers out the video signal fetched thereby for display until the video signal is next fetched.

Accordingly, the image memory is always allowed to deliver a video signal reproduced at a correct tracking position to thereby prevent the occurrence of the noise band during the special image reproduction.

DESCRIPTION OF THE PREFERRED EMBODIMENTS

The invention will now be described by way of example with reference to the accompanying drawings.

Figure 1:
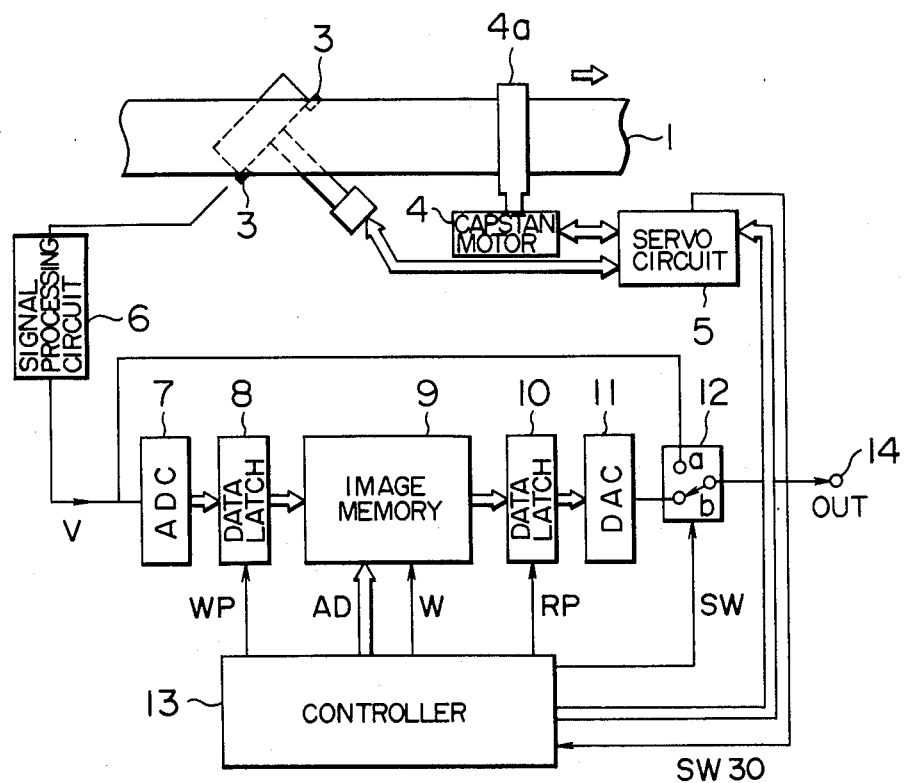
FIG. 1 is a block diagram showing a magnetic reproducing apparatus according to an embodiment of the invention.

Referring to FIG. 1, there is shown, in block form, a magnetic reproducing apparatus according to a preferred embodiment of the invention. The magnetic reproducing apparatus comprises a magnetic tape 1, a head drum motor 2, a rotary magnetic head 3, a servo circuit 5 for controlling the head drum motor 2 and a capstan motor 4, a signal processing circuit 6 for demodulating an FM video signal produced from the rotary head 3 and converting a demodulated signal into a video signal V of a base band, an analog to digital converter (hereinafter simply referred to as ADC) 7, a data latch 8 responsive to a write latch pulse signal WP to latch an output signal from the ADC 7, an image memory 9 using, for example, a semiconductor RAM (Random Access Memory), a data latch 10 responsive to a read latch pulse signal RP to latch a signal read out of the image memory 9, a digital to analog converter (hereinafter simply referred to as DAC) 11, a switch 12, and a controller 13 constituted with independent logical circuits or a microcomputer. The controller 13 comprises a magnetic tape travel control means which controls the capstan motor 4 through the servo circuit 5 in order to travel the magnetic tape 1 at variable speeds, and a memory control means which controls the write-/read operation of the image memory 9.

With the FIG. 1 apparatus, for example, intermittent slow-motion reproduction (slow-motion reproduction as a result of intermittent feeding of the magnetic tape 1) of a recorded video signal is carried out as will be described below.

Figure 2:
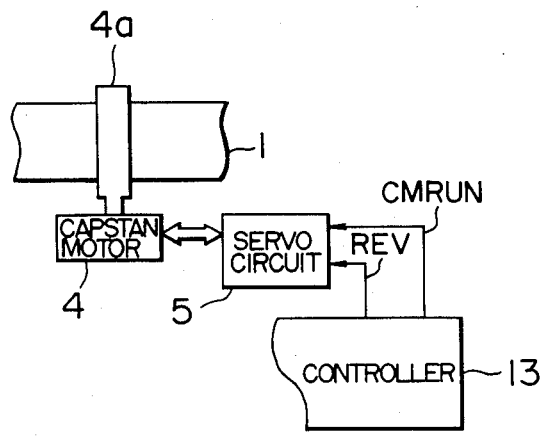
FIG. 2 is a block diagram showing an example of a magnetic tape travel control system operated for intermittent slow-motion reproduction mode.

More particularly, during the intermittent slow-motion reproduction, the controller 13 supplies to the servo circuit 5, as shown in FIG. 2, a signal CMRUN for intermittent drive of the cupstan motor 4 at a standard speed (equal to a speed used for recording) and a signal REV for counter-current braking of the capstan motor 4 which is intended for rapid stopping thereof at a cycle of completion of each intermittent drive, thereby enabling the magnetic tape 1 to intermittently travel at the standard travel speed.

Figure 3:
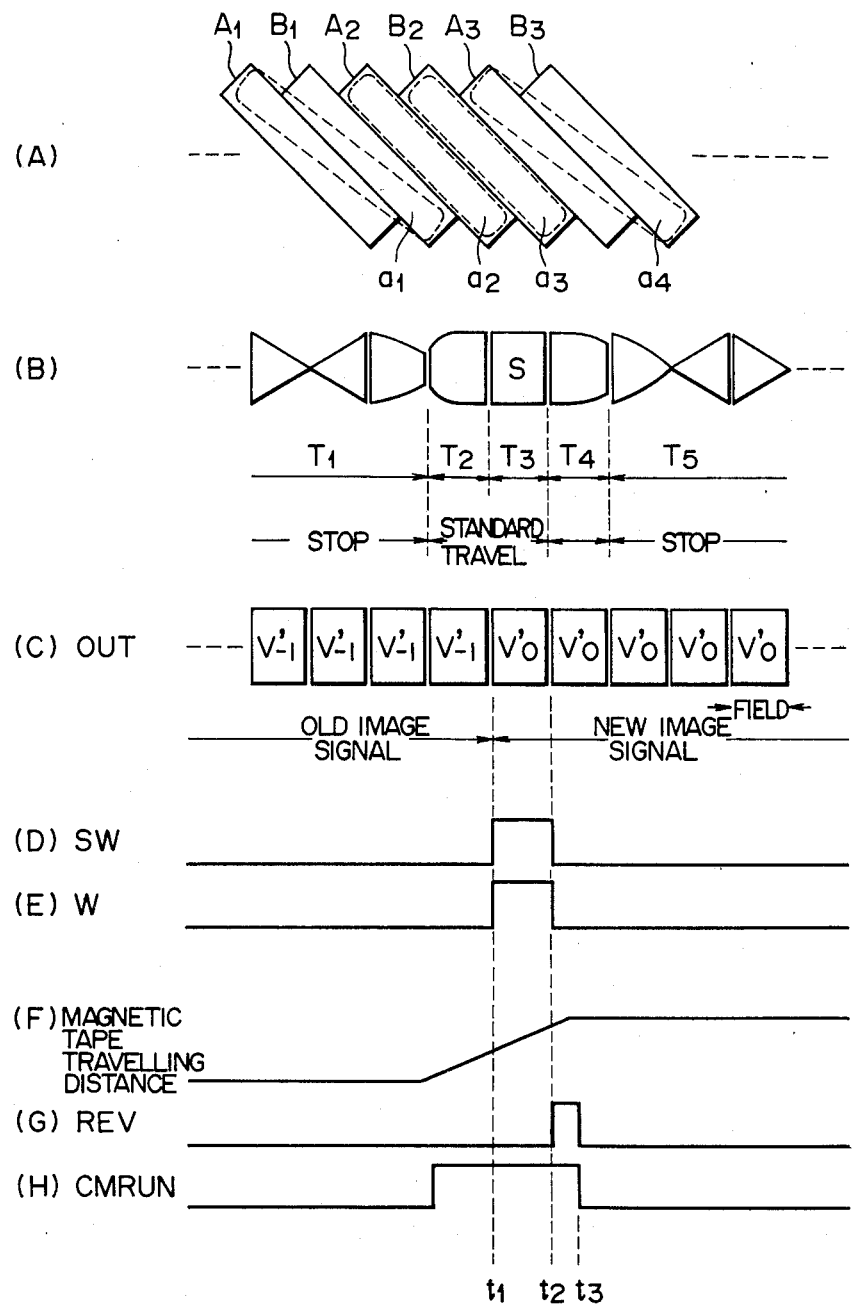
FIG. 3 illustrates, in sections (A) through (H), engagement states between the rotary head and the magnetic tape during the intermittent slow-motion reproduction and waveforms associated therewith.

FIG. 3 illustrates the relation between reproduction scanning trace of the rotary magnetic head 3 and video signal tracks recorded on the magnetic tape 1 and signal waveforms which occur during the intermittent slow-motion reproduction.

Referring to FIG. 3, it will first be explained how travelling of the magnetic tape 1 is controlled by the controller 13.

The controller 13 intermittently supplies the servo circuit 5 a signal CMRUN, as shown at (H) in FIG. 3, and a signal REV as shown at (G) in FIG. 3. The motor is rotated by the signal CMRUN, the rotation of the motor being reversed by the sigal REV. In order to rapidly stop the motor, a counter-current breaking is carried out by supplying the signal REV to the servo circuit 5 while the motor is rotating. As a result, the capstan motor 4 repeats cycles of rotation and stopping.

Each time the magnetic tape 1 driven by the capstan motor 4 reaches the standard travel speed, the controller 13 causes the data latch circuit 8 to sample a video signal S at (B) in FIG. 3 which has been produced from the magnetic head 3 and converted by the ADC 7 into a digital signal, and the thus sampled video signal S is written into the image memory 9.

This procedure will be described below in greater detail.

During duration periods $T_1$ and $T_4$, the capstan motor 4 is stopped by the controller 13. Because, during these periods, a relative speed between the magnetic tape 1 and the rotary head 3 retards as compared to a relative speed therebetween occurring when recording, a reproduction scanning trace $a_1$ of the magnetic head 3 deviates from a recording track $A_1$ on the magnetic tape 1 as seen at (A) in FIG. 3. Consequently, the magnetic head 3 can not trace the recording track $A_1$ correctly and a video signal reproduced from the magnetic head 3 contains a noise.

During a duration period $T_2$, the capstan motor 4 starts rotating and its speed is increased until the standard travel speed.

During the latter half of the period $T_2$, the capstan motor 4, now reaching the standard travel speed, drives the magnetic tape 1 at a constant speed, with the result that a reproduction scanning trace $a_2$ of the magnetic head 3 substantially coincides with a recording track $A_2$ on the magnetic tape 1.

During a period $T_3$, the magnetic tape 1 is moved by the capstan motor 4 stably at the standard travel speed, with the result that a reproduction scanning trace $a_3$ of the magnetic head 3 exactly coincides with a recording track $B_2$ on the magnetic tape 1. During the period $T_3$, the reproduced FM video signal S delivered out of the magnetic head 3 becomes stable without a decrease in level as shown at (B) in FIG. 3, and this signal may be demodulated by the signal processing circuit 6 shown in FIG. 1 to produce a reproduced video signal Vo of high S/N which opposes picture quality degradation. From the above viewpoint, in accordance with this embodiment, the controller 13 provides a control signal SW as shown at (D) in FIG. 3 over the period $T_3$ during which the reproduced video signal vo can be obtained.

Then, the switch 12 responds to the control signal SW to transfer to a contact a, so that the reproduced video signal Vo is directly passed through the switch 12 to an output terminal 14 of the apparatus, providing a reproduced output signal OUT while one field portion of the reproduced video signal Vo is written and stored in the image memory 9 through the ADC 7 and data latch 8.

The portion of video signal Vo, thus written in the image memory, is repetitively delivered out of the memory under the direction of the controller 13 until the next sampling. This video signal read out of the image memory 9 is passed through the data latch 10, DAC 11 and switch 12 to provide a reproduced output signal OUT because the switch 12 has already been reset to a contact b.

FIG. 3 illustrates at section (c) a series of output signals OUT produced by way of the switch 12 during the slow-motion reproduction. As shown, the reproduced video signal V produced at the phase of reproduction scanning trace $a_3$ and delivered out of the apparatus directly through the switch 12 transferred to the contact a is represented by the signal Vo. After the delivery of the signal Vo, signal Vo' are read out of the image memory 9 in order to provide output signals. Before the occurrence of the signal Vo, signals V'−1 have been stored in the image memory 9, representing a video signal that was obtained during a standard travel speed period of the magnetic tape which preceded one sampling period. In FIG. 3, the signals V'−1 are termed an old image signal and the signals Vo and Vo' are termed a new image signal.

The write/read operation of the image memory 9 for the video signal is suitably controlled by a write command signal W at (E) in FIG. 3, an address signal AD, the write latch pulse signal WP and the read latch pulse signal RP which are produced from the controller 13 on the basis of a control signal SW 30, shown in (D) of FIG. 3, supplied from the servo circuit 5. Details of these synchronous signals will be described later.

Figure 4:
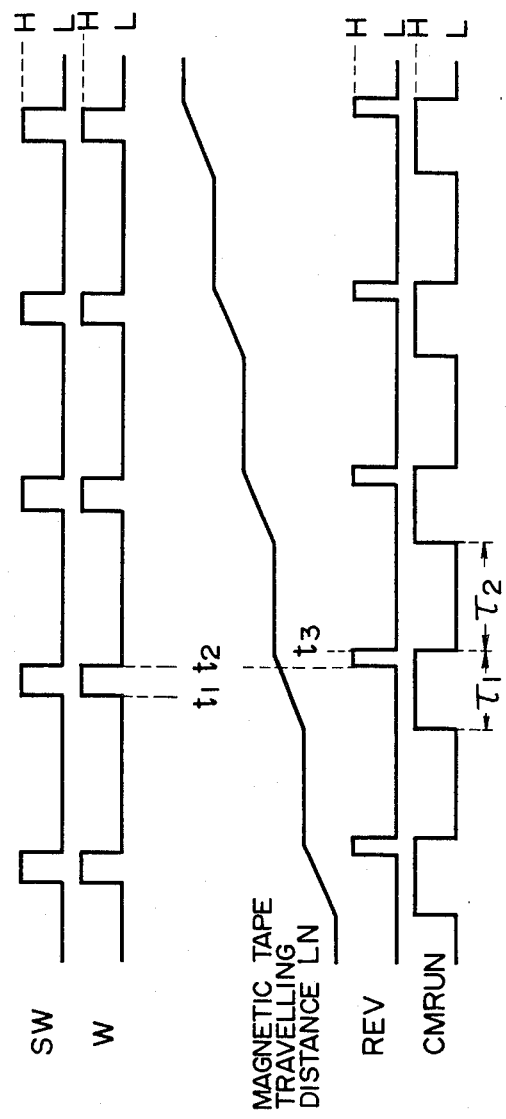
FIG. 4 is a waveform diagram showing some of the FIG. 3 waveforms on a reduced time axis.

FIG. 4 illustrates, on a reduced time axis as compared to FIG. 3, how the control signal SW for the switch 12, write command signal W for the image memory 9, magnetic tape travelling distance LN, and signals CMRUN and REV for intermittent drive and stopping of the magnetic tape vary during the intermittent slow-motion reproduction. The travel speed of the magnetic tape 1 for the intermittent slow-motion reproduction corresponds to an averaged gradient of the magnetic tape travelling distance LN shown in FIG. 4, though partially depicted at (F) in FIG. 3, and it can be varied by changing the duty ratio of signal CMRUN as defined by a standard speed drive period $\tau_1$ and a stopping period $\tau_2$. The write command signal W changes from low level L to high level H during the latter half of the standard speed drive perod $\tau_1$ and the high level signal continuing from time $t_1$ to time $t_2$ causes the image memory 9 to write the video signal Vo. Upon completion of writing of the video signal Vo into the image memory 9 the signal REV for countercurrent breaking and stopping of the capstan motor 4 changes from low level L to high level H and the high level signal continues from time $t_2$ to time $t_3$, thereby stopping the capstan motor 4.

Figure 5:
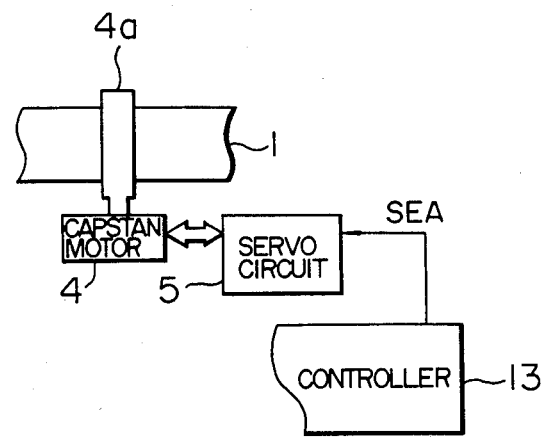
FIG. 5 is a block diagram showing an example of the magnetic tape travel control system operated for high-speed search reproduction.
Figure 6:
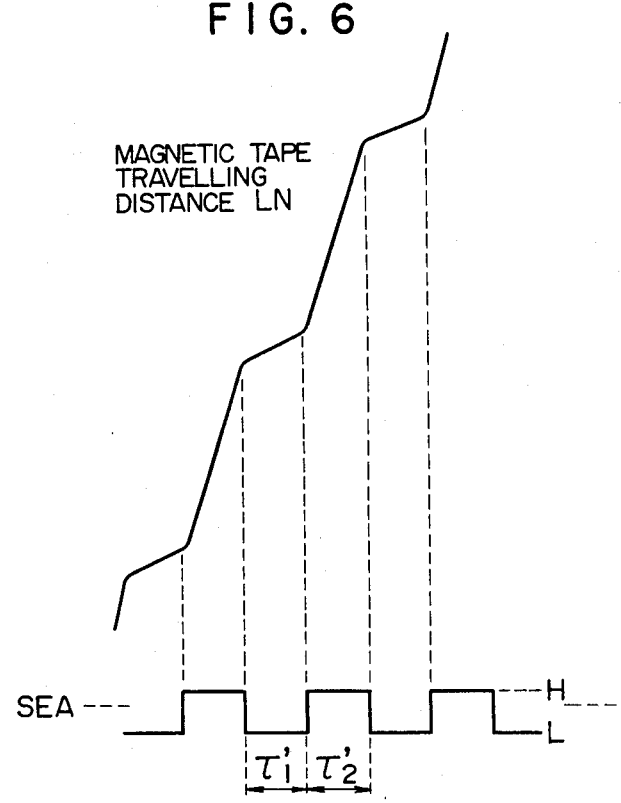
FIG. 6 is a graph useful in explaining the operation during the high-speed search reproduction.

The following description will be directed to high-speed search reproduction. In the high-speed search reproduction, the controller 13 supplies, as shown in FIG. 5, to the servo circuit 5 a signal SEA for alternate drive of the capstan motor 4 at a high travel speed and at the standard travel speed. As illustrated in FIG. 6, during a period $\tau_2'$, the signal SEA assumes a high level H and the magnetic tape runs at the high travel speed and during a period $\tau_1'$, assumes a low level L for running of the magnetic tape at the standard travel speed. Like the intermittent slow-motion reproduction described previously, the reproduction scanning trace of the magnetic head 3 coincides with the recording tracks on the magnetic tape 1 during the standard travel speed period $\tau_1'$ of the magnetic tape. Therefore, during the standard travel speed period $\tau_1'$, one field of the video signal is written into the image memory 9 and thereafter, repetitively read out of the memory until the next sampling period to provide a reproduction output signal OUT. During the write period of the image memory 9, the reproduced video signal freed from the picture quality degradation is passed directly through the switch 12 transferred to the contact a to provide for the reproduction output signal OUT. The speed of the high-speed search reproduction corresponds to an averaged gradient of a magnetic tape travelling distance LN as shown in FIG. 6 and can be varied by changing the duty ratio of signal SEA as defined by the standard travel speed period $\tau_1'$ and high-speed travel period $\tau_2'$.

The operation of the FIG. 1 embodiment has been described, as hereinbefore, in connection with the intermittent slow-motion reproduction and the high-speed search reproduction, but it will readily be understood that the FIG. 1 embodiment can will be adapted, in similar ways, to perform other desired variable speed reproduction such as still reproduction, frame feed reproduction and continuous slow-motion reproduction (slow-motion reproduction effected without stopping the magnetic tape). In still reproduction mode, however, the magnetic tape should obviously be controlled for travelling such that once the magnetic tape has been travelled at the standard speed, it continues to stop, in contrast to the other variable speed reproduction modes wherein the travelling at the standard speed is reiteratively repeated.

The write/read operation of the image memory 9 in the FIG. 1 embodiment will now be described specifically by referring to signal waveforms shown in FIG. 7.

Figure 7:
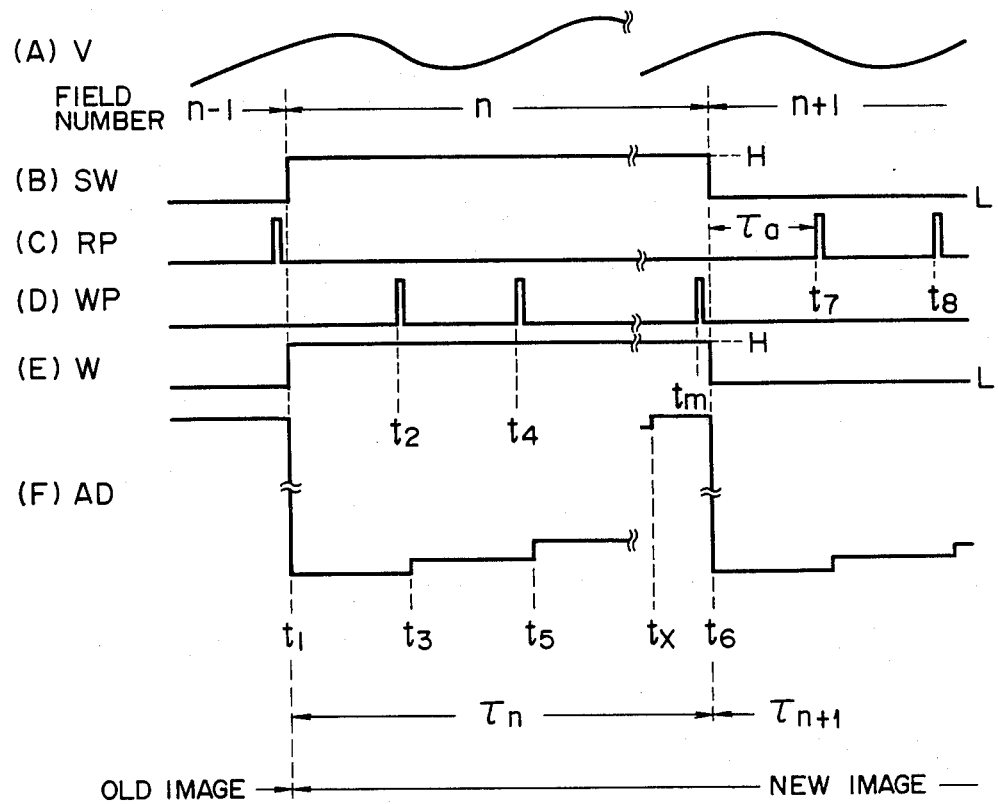
FIG. 7 illustrates, in sections (A) through (F), signal waveforms useful to explain the write/read operation of an image memory.

An instantaneous waveform of the video signal V as shown at (A) in FIG. 7 is converted into a digital signal by the ADC 7 and fed to the data latch 8 as will be clear from FIG. 1. Assuming that an n-th field portion of the video signal V shown at (A) in FIG. 7 (a portion of the video signal picked-up during the standard speed travel of the magnetic tape) is written into the image memory 9, the controller 13 produces write latch pulses WP as shown at (D) in FIG. 7 at times $t_2, t_4, \ldots t_m$ within a field period $\tau_n$ and changes the write command signal W from low level L to high level H at a time $t_1$ as shown at (E) in FIG. 7. The image memory 9 is operable in write mode when the write command signal W is high and in read mode when low. The controller 13 also produces an address signal AD which sequentially increments at times $t_1, t_3, t_5, \ldots t_x$ as shown at (F) in FIG. 7. Accordingly, during the field period $\tau_n$, the data latch 8 responds to the write latch pulses WP to sequentianlly latch and supply, pixel by pixel, a digital video signal produced from the ADC 7 to the image memory 9 which in turn writes and stores the received digital signal into addresses designated by the address signal AD sequentially incrementing from zero. During a period $\tau_{n+1}$ for an (n+1)th field portion and ensuring portions (variable speed travel period of the magnetic tape), the controller 13 produces read latch pulses RP as shown at (c) in FIG. 7 at times $t_7$ and $t_8$, changes the write command signal W from high level H to low level L at a time $t_6$, and finally resets the address signal AD to zero for the subsequent sequential increment. Consequently, the digital video signal stored in the individual addresses of the image memory 9 is sequentially read pixel by pixel, latched by the data latch 10 and converted by the DAC 11 into the original analog video signal. At this phase, since the control signal SW (at (B) in FIG. 7) produced from the controller 13 assumes a low level L to transfer the switch 12 to the contact b, the output signal of the DAC 11 is passed through the switch 12 to provide for a reproduced output signal OUT. The above write/read operation of the image memory 9 is repeated sequentially and cyclically in the variable reproduction mode excepting the still reproduction mode as described previously. In a region of an (n−1)th field portion (old image region), the image memory 9 is operative to read a video signal stored during one cycle preceding period.

In order to synchronize the write operation of the image memory 9 with the one field portion of video signal 1 which is freed from picture quality degradation by being reproduced during the standard travel speed period of the magnetic tape, the controller 13 is supplied with the control signal SW 30 produced from the servo circuit 5. As the control signal SW 30, a wellknown head switching signal (representative of the field period of reproduced image) may exemplarily be used which is formed by detecting the rotation phase of the head drum motor 2. In this case, the controller 13 changes the write command signal W to high level in synchronism with the head switching signal after lapse of a predetermined time which is expected to range from initiation of the standard speed travel of the magnetic tape 1 to coincidence of the reproduction scanning trace of the rotary head 3 with the recording tracks under the direction of the servo circuit 5. The image memory 9 responds to the change to high of write command signal W to start writing the one field portion of the image memory 9. A variety of examples used as the control signal SW 30 may be considered, including a head switching signal which is produced after the coincidence of the reproduction scanning trace of the rotary head 3 with the recording tracks (locked condition of the tracking servo) has been detected by the servo circuit 5.

Especially where the video signal is sampled at a frequency of 10 MHz and digitized at 6 bits/sample, the image memory 9 used in the FIG. 1 embodiment set forth thus far has specific numerical values which are 1 M bit of required capacity per field, and about 100 nsec or less of required access time (covering changing of address and reading, and substantially corresponding to $\tau_a$ at (c) in FIG. 7).

Figure 8:
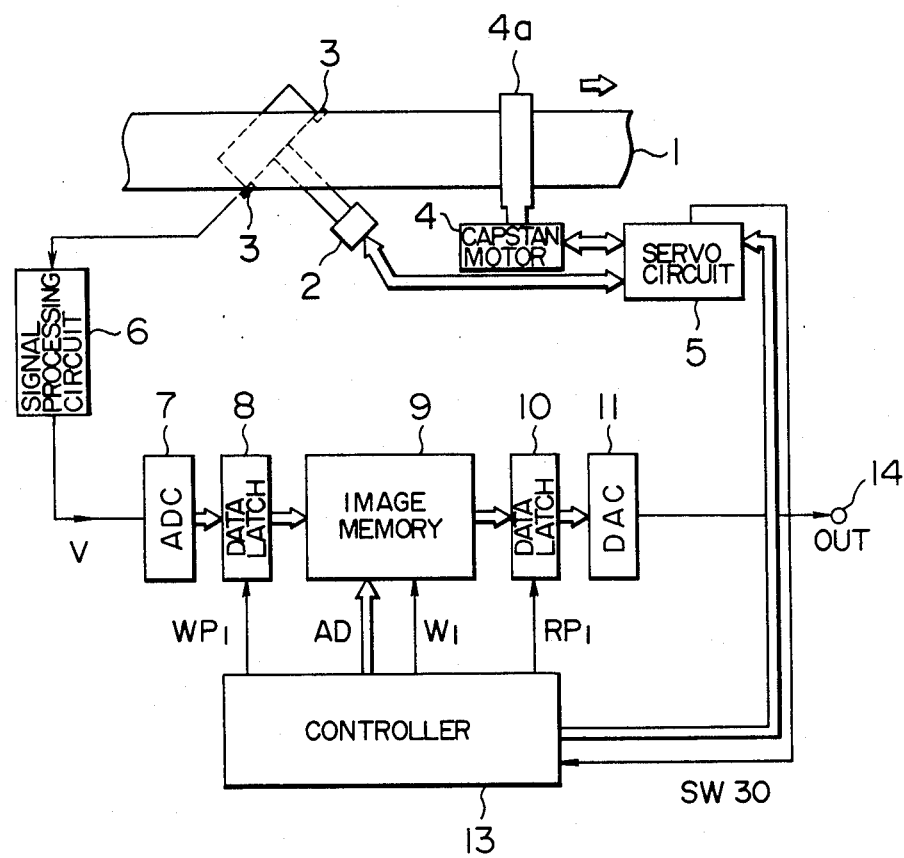
FIG. 8 is a block diagram showing a magnetic reproducing apparatus according to another embodiment of the invention.

Turning to FIG. 8, there is illustrated another embodiment of the present invention. Being differert from the FIG. 1 embodiment, a magnetic reproducing apparatus in accordance with the FIG. 8 embodiment is removed of the switch 12. Accordingly, a video signal stored in an image memory 9 is constantly delivered to an output terminal 14. In this embodiment of magnetic reproducing apparatus, writing and reading of the video signal to and from the image memory must be performed within the same standard travel speed period. For convenience sake, such write and read operations will hereinafter be referred to as parallel write/read operation.

For the parallel write/read operation, a controller 13 produces write latch pulse signal, write command signal and read latch pulse signal which are different from those for the FIG. 1 embodiment and so designated by WP1, W1 and RR1, respectively, for distinction from the latter signals. Advantageously, the FIG. 8 magnetic reproducing apparatus can always obtain uniform reproduction images because of elimination of switching effected by switch 12 in the FIG. 1 magnetic reproducing apparatus between the video signal proceeding on through the image memory 9 and the video signal not proceeding no therethrough.

Figure 9:
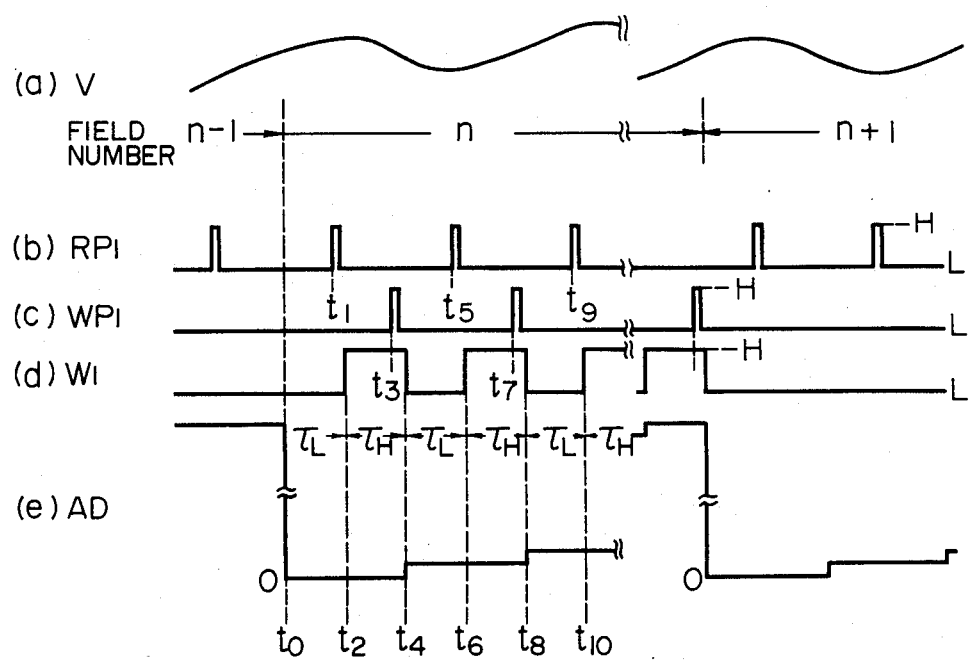
FIG. 9 illustrates, in sections (a) through (e), signal waveforms useful to explain the write/read operation of an image memory used in the FIG. 8 embodiment.

FIG. 9 illutrates signal waveforms appearing in the parallel write/read operation of the image memory 9 in accordance with the FIG. 8 embodiment. As will be seen from FIG. 9, in the magnetic reproducing apparatus of FIG. 8, a write command signal w1 at (d) in FIG. 9 alternately changes between low level L and high level H during a period for an n-th field (freed from picture quality degradation) of a reproduced image signal V at (a) in FIG. 9, in order for the image memory 9 to alternately read and write the video signal. More specifically, a read latch pulse signal RP1 at (b) in FIG. 9 changes to high level H at times $t_3, t_5, t_9, \ldots$ within periods $\tau_L$ over which the write command signal W1 assumes a low level L, with the result that a stored video signal is read, pixel by pixel, from predetermined addresses of image memory 9 designated by an address signal AD at (e) in FIG. 9. Immediately after that, the write command signal W1 changes to high level H at time $t_2, t_6, t_{10}, \ldots$ and a write latch pulse signal WP1 assumes a high level H at times $t_3, t_7, \ldots$ within periods $\tau_H$ over which the write command signal W1 is high, with the result that a new video signal is written, pixel by pixel, into the same addresses as those used for reading. The address signal AD is incremented each time each combined write/read operation completes, so that the parallel write/read operation sequentially proceeds until the end of the n-th field portion of the vide signal. Namely, in the magnetic reproducing apparatus as shown in FIG. 8, an old image can be read out from the image memory 9 while a new image is written to the memory 9 because the video signal is read out from the image memory 9, being stored to the data latch 10, and then the new image signal is stored to the same address of the memory 9, wherein the old image signal was stored, thereby ensuring that the switch 12 of the FIG. 1 magnetic reproducing apparatus can be eliminated in the FIG. 8 apparatus. Excepting the above, the operation of the FIG. 8 apparatus is the same as that of the FIG. 1 apparatus and will not be described here for avoidance of prolixity of explanation.

Although the foregoing embodiments have been described by referring to the image memory 9 adapted to store one field portion of the video signal, the amount of stored image is not limited to one field but may be one frame, for example. Further, the image memory 9 and its write/read control means are not limited to the type described in the foregoing embodiments but other desired type may be used. Furthermore, sequential increment of the address signal supplied to the image memory 9 may be replaced with sequential decrement.

According to the invention, during the special mode reproduction in the helical scan type magnetic reproducing apparatus, the magnetic tape is travelled intermittently at the standard speed, only a portion of the video signal reproduced during the standard travel speed period is stored in the image memory, and the stored image is read out of the image memory repetitively during non-standard travel speed periods to provide the reproduced output signal. Therefore, the present invention can provide the magnetic reproducing apparatus capable of constantly producing reproduction images of high quality freed from noise band in any variable speed reproduction mode such as high-speed search, slow-motion and still reproduction and so eliminating the prior art disadvantages.

What is claimed is:

1. In a helical scan type magnetic reproducing apparatus having a rotary magnetic head engageable with a magnetic tape, a servo circuit for controlling rotation of the rotary magnetic head, a capstan motor for enabling travel of the magnetic tape, and a video signal processing circuit for processing a video signal read out of said magnetic tape by means of said magnetic head, wherein said capstan motor is controlled such that said magnetic tape is caused to travel at a speed different from a tape travel speed used for recording in order to perform special reproduction, said apparatus comprising:

magnetic tape travel speed controlling means, connected to said capstan motor, for causing the magnetic tape running under a first running condition to travel under a second running condition intermittently, said magnetic tape travelling at a speed different from the tape travel speed for recording under the first running condition and travelling at the same speed as the tape travel speed for recording under the second running condition;

an image memory, connected to said video signal processing circuit, for storing the video signal during at least one field period; and memory controlling means, connected to said image memory, for reading out the stored video signal over a period during which said magnetic tape runs under said first running condition, for supplying a sequentially changing address signal to said image memory over the period during which said magnetic tape runs under the second running condition, and for sequentially supplying a read command signal and a write command signal to said image memory during the same address period.

2. The magnetic reproducing apparatus according to claim 1 further comprising switch means, connected to the output of said image memory, for switching either a reproduced video signal proceeding on through said image memory or a reproduced video signal not proceeding on therethrough to an output terminal of said apparatus to provide for an output reproduction signal.

3. The magnetic reproducing apparatus according to claim 2, wherein said switch means switches the reproduced video signal not proceeding on through said image memory to said output terminal over the period during which said magnetic tape runs under the second running condition. to said image memory during the same address period.

4. The magnetic reproducing apparatus according to claim 1, wherein said first running condition is representative of stopping of said magnetic tape.

5. The magnetic reproducing apparatus according to claim 1, wherein said magnetic tape runs at a higher speed than that for recording under said first running condition.

6. The magnetic reproducing apparatus according to claim 1, wherein said magnetic tape runs at a lower speed than that for recording under said first running condition.

7. The magnetic reproducing apparatus according to claim 1, wherein said memory control means supplied said address signal which increases by sequential increments to said image memory.

8. The magnetic reproducing apparatus according to claim 1, wherein said memory control means supplies said address signal which decreases by sequential decrements to said image memory.

9. The magnetic reproducing apparatus according to claim 1, wherein siad address signal, write command signal and read command signal which are supplied from said memory controlling means to said image memory are synthesized from a head switching signal outputted from said servo control circuit for controlling rotation of the rotary magnetic head.

10. The magnetic reproducing apparatus according to claim 1, wherein said magnetic tape travel speed controlling means controls said capstan motor to carry out counter-current braking at least one of immediately before changing into said second running condition and immediately before termination of said second running condition.

* * * * *